United States Patent [19]

Delling

[11] Patent Number: 5,775,777
[45] Date of Patent: Jul. 7, 1998

[54] HEAD SUPPORT ARRESTING ARRANGEMENT

[75] Inventor: Gerhard Delling, Schmidgaden, Germany

[73] Assignee: Grammer AG, Amberg, Germany

[21] Appl. No.: 858,273

[22] Filed: May 19, 1997

[30] Foreign Application Priority Data

May 25, 1996 [DE] Germany .................. 196 21 770.7

[51] Int. Cl.[6] ............................................. A47C 7/38
[52] U.S. Cl. ................... 297/410; 403/325; 403/374; 248/295.11; 248/408
[58] Field of Search ............... 297/410, 411.36; 248/295.11, 297.31, 408; 403/321, 325, 374

[56] References Cited

U.S. PATENT DOCUMENTS 3,544,162  12/1970  Uchiyamada et al. ............ 297/410
4,545,618  10/1985  Kitamura ........................... 297/410
4,604,777  8/1986   Meeks ............................... 297/410

FOREIGN PATENT DOCUMENTS 3437803  6/1986  Germany ........................... 297/410
19177    8/1914  United Kingdom ............... 248/408

Primary Examiner—Peter R. Brown
Attorney, Agent, or Firm—William Squire

[57] ABSTRACT

A head support arresting device co-operates with a connecting element for connecting a height-adjustable head support to a vehicle seat back rest. The connecting element has mutually spaced recesses and the arresting device has a retaining member resiliently displaceable in a housing between a retaining position and a release position. The retaining member has a retaining edge and at least one slide edge so arranged relative to each other that in the retaining position the retaining edge is engaged into a corresponding recess in the connecting element. In the release position the at least one slide edge bears slidably against the outside contour of the associated connecting element and the retaining edge is spaced from the connecting element.

15 Claims, 2 Drawing Sheets

HEAD SUPPORT ARRESTING ARRANGEMENT

FIELD OF THE INVENTION

The invention concerns a head support arresting arrangement, for example for use in relation to a motor vehicle seat.

BACKGROUND OF THE INVENTION

A head support or head rest is nowadays usually provided to afford support for the head of the occupant of a motor vehicle seat, for example to contribute to at least reducing neck injuries and the like which may be caused in a motor vehicle accident. The head support is generally connected adjustably in respect of height to the back rest of the vehicle seat by means of two connecting elements which are arranged in side-by-side relationship. Such an assembly may then also have one or two head support arresting devices co-operable with a respective connecting element connecting the head support to the vehicle seat back rest. The connecting element has mutually spaced recesses while the arresting device has a retaining member which is resiliently disposed in a housing and which is displaceable between a retaining position of engaging into a said recess in the connecting element, and a release position in which the connecting element is slidable for adjustment for example of the height of the head support.

The recesses provided in the connecting element or elements may be in the form of milled-out recesses of a generally V-shaped configuration. Milled-out recesses of that kind however involve a not inconsiderable level of manufacturing expenditure. Connecting elements may also have recesses in the form of grooves extending around the respective corresponding connecting element. Grooves of that kind can be inexpensively produced by means of a suitable tool, in comparison with the above-mentioned milled-out recesses.

In the case of a typical head support arresting device as indicated above, the retaining member comprises a sheet metal member with a central hole having a retaining edge which is of a straight configuration. Either that straight retaining edge of the retaining member resiliently engages into a corresponding recess on the associated connecting element, or, when the head support is being adjusted in relation to the back rest of the motor vehicle, the retaining edge slides resiliently against the outside contour of the associated connecting element, between the mutually adjacent recesses in the connecting element. The sliding contact between the retaining edge of the retaining member and the surface of the connecting element causes a wear track to be formed thereon, and that can be visible on the connecting element, thereby detrimentally affecting the appearance thereof. To prevent the wear track from being formed in that way, it is possible for the retaining member to be combined with a plastic member or to be coated with plastic material. It has been found however that a retaining member of such a design configuration can leave something to be desired when put in the corresponding arresting position, in terms of the reliability of the arresting action that it affords.

SUMMARY OF THE INVENTION

An object of the present invention is to provide a head support arresting device which eliminates a wear track between adjacent recesses in the connecting element co-operable therewith while at the same time ensuring reliable arresting in the arresting position of the device.

Another object of the present invention is to provide a head support arresting arrangement which is quick and reliable in operation while nonetheless affording a safe and secure arresting action.

Still another object of the present invention is to provide a head support adjusting arrangement which is easy to operate and which gives a firm metal-to-metal securing contact in the arresting position while avoiding metal contact in the release position.

In accordance with the principles of the present invention the foregoing and other objects are attained by a head support arresting device co-operable with a connecting element for connecting a height-adjustable head support to a back rest of a vehicle seat. The connecting element has mutually spaced recesses and the arresting device has a housing and a retaining member resiliently displaceable in the housing between a release position and a retaining position of engaging into a recess of the connecting element. The retaining member has a retaining edge and at least one slide edge, the retaining edge and the slide edge being so disposed relative to each other that in the arresting position of the device the retaining edge is engaged into a respective corresponding recess and in the release position the at least one slide edge bears slidably against the outside contour of the associated connecting element and the retaining edge is spaced from the connecting element.

In a preferred feature of the invention the retaining edge comprises metal and the at least one slide edge comprises plastic material.

Preferably, the recesses in the connecting element which connects the head support to the back rest of a vehicle seat are in the form of peripherally extending grooves in the connecting element.

While the retaining member may have a retaining edge and a single slide edge which adjoins the retaining edge, a preferred feature of the invention provides that the retaining member has first and second slide edges which include an acute angle with each other and a retaining edge which interconnects the first and second slide edges. The two slide edges which diverge in a direction away from the retaining edge, and the retaining edge itself, are of such a configuration that the retaining edge is spaced from the outside contour of the associated connecting element when the first and second slide edges bear resiliently against the outside contour of the connecting element in the release position of the device while the retaining edge bears resiliently in the respective recess in the connecting element when the retaining member is in the retaining or arresting position.

As the retaining edge, in accordance with a preferred feature of the invention, comprises metal, there is therefore metal-to-metal contact between the retaining member and the connecting element in the arresting position, but that metal-to-metal contact is then lost in the release position.

An arresting device according to the invention with first and second slide edges has the advantage that the pressure in relation to surface area of the retaining member against the outside contour of the connecting element is distributed as between first and second slide edges, instead of a single retaining edge, while in addition the pressure force which actually takes effect on the outside contour of the connecting element perpendicularly thereto is reduced by a factor which corresponds to the sine of half the included angle between the first and second slide edges of the retaining member and is thus very small. Consequently the head support arresting device according to the invention prevents in a simple manner the production of undesirable wear tracks or lines along the outside contour of the connecting element between the recesses therein, which are desirably in the form of peripherally extending grooves. On the other hand however the design arrangement according to the invention ensures that the connecting element is very reliably secured in position in the arresting or retaining position of the retaining member, with the arresting action being produced in particular by the rectilinearly extending retaining edge comprising metal and in addition by virtue of the two slide edges which include an acute angle relative to each other.

Therefore, as already mentioned above, the arresting or retaining position of the arrangement involves metal-to-metal contact between the retaining edge and the metal surface of the corresponding recess in the connecting element. The release position of the assembly involves slidably movable contact of the at least one slide edge of the retaining member, said edge comprising plastic material, against the outside contour of the connecting element, thus at least reducing the formation of unattractive wear tracks. That is also avoided in particular by virtue of the fact that in the release position the retaining member is at the same time advantageously spaced from the outside contour of the connecting element. Metal-to-metal contact is therefore advantageously eliminated in the release position.

The two slide edges which include an acute angle with each other and the retaining edge can be so disposed in the retaining member that in the arresting or retaining position it is in fact only the retaining edge that bears snugly against the inside contour of the connecting element or the corresponding retaining recess therein.

In a further preferred feature of the invention however the first and second slide edges and the retaining edge may be of such configurations that in the arresting or retaining position the retaining member also bears resiliently with the slide edges against the inside contour of the respective retaining recess or peripherally extending groove in the connecting element. That provides for three-sided contact of the retaining member against the inside contour of the respective retaining recess or groove in the corresponding connecting element and thus ensures reliable arresting of the connecting element, thus ensuring that the head support is firmly fixed in relation to the back rest of the corresponding vehicle seat.

A preferred feature of the invention provides that the slide edges are disposed symmetrically with respect to a center line oriented perpendicularly to the retaining edge, because that then gives appropriate symmetrical conditions in regard to the forces involved and thus affords a reliable mode of operation for the head support arresting device according to the invention.

A preferred feature of the invention provides that the retaining member comprises a sheet metal material and the first and second slide edges are formed by a plastic coating on the corresponding portions of the sheet metal material of the retaining member. That design configuration exhibits excellent long-term strength with optimized operating properties. The plastic material adopted for the coating on the retaining member is preferably a material which exhibits good abrasion resistance and which affords a suitable coefficient of friction in regard to the material of the connecting element.

Further objects, features and advantages of the present invention will be apparent from the following description of a preferred embodiment thereof.

DESCRIPTION OF THE PREFERRED EMBODIMENT

Figure 1:
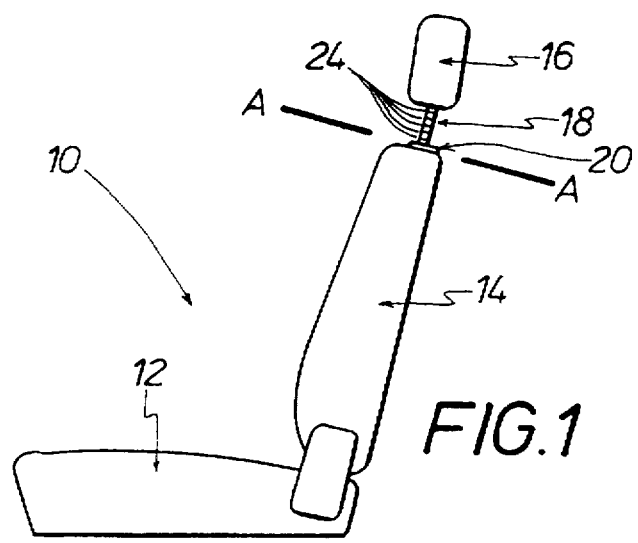
FIG. 1 is a diagrammatic side view of a vehicle seat including a back rest and a height-adjustable head support connected to the back rest by means of two connecting elements.

Referring firstly to FIG. 1, diagrammatically shown as a side view therein is a vehicle seat 10 having a seat portion or squab 12 and a back rest 14. Provided at the upper end of the back rest 14 is a head support or head rest 16 which is connected adjustably in respect of height to the back rest 14 by two connecting elements 18 which are spaced from each other transversely of the seat. Only one of the two connecting elements 18 is visible in FIG. 1.

First and second head support arresting devices diagrammatically indicated at 20 are provided on the back rest 14, associated with respective ones of the two connecting elements 18.

Figure 2:
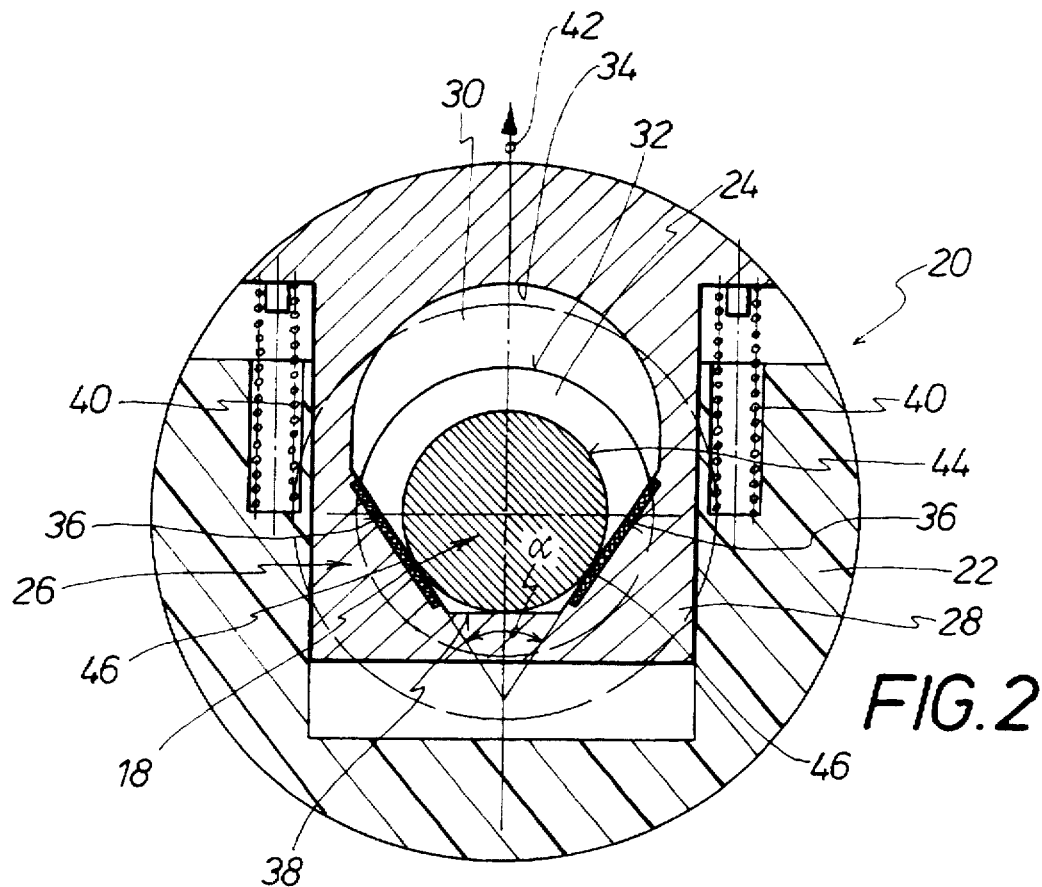
FIG. 2 is a view in section taken along line A—A in FIG. 1 through one of the connecting elements therein and through the associated head support arresting device on a greatly enlarged scale, showing the retaining member of the device in the arresting position.
Figure 3:
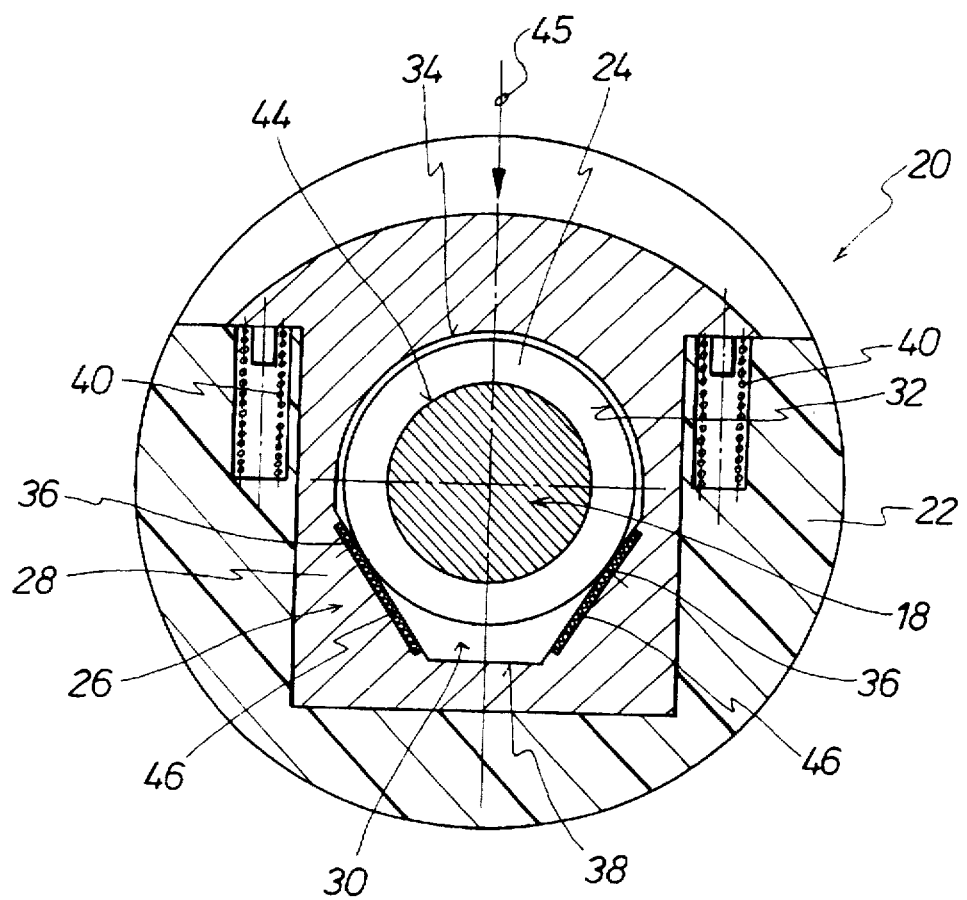
FIG. 3 is a view in section similar to that shown in FIG. 2, in which the retaining member of the head support arresting device is shown in the release position.

Referring now also to FIGS. 2 and 3, each head support arresting device 20 comprises a housing 22 through which the respectively associated connecting element 18 passes in central relationship therein. Each connecting element 18 is provided with a plurality of peripherally extending grooves 24 constituting retaining recesses which are disposed in the connecting element 18 at spacings from each other in the longitudinal direction of the connecting element 18, as can best be seen from FIG. 1.

Reference 26 denotes a retaining member which is disposed in the housing 22 of the respective head support arresting device 20, being movable linearly transversely with respect to the longitudinal direction of the associated connecting element 18. The retaining member 26 is shown in the arresting or retaining position in FIG. 2 and in the release position in FIG. 3. The retaining member 26 comprises a sheet metal member 28 with a hole 30 therethrough. The connecting element 18 extends through the hole 30. The hole 30 has an edge portion as indicated at 34, which is matched to the outside contour 32 of the connecting element 18, and two slide edges 36 which are disposed in adjoining relationship to the edge portion 34 and which include relative to each other an acute angle as indicated at α. The first and second slide edges 36 are connected together, on the side remote from the edge portion 34 of the hole 30, by a retaining edge as indicated at 38.

In the normal operating position of the head support arresting device 20 which is thus the arresting or retaining position, the retaining member 26 is urged by spring members indicated at 40 in the form of coil compression springs, in the direction indicated by the arrow 42, in such a way that the retaining member 26 adopts the retaining position in which at least the retaining edge 38 bears against the inside contour 44 of the connecting element 18, which is determined by a corresponding peripherally extending groove 24. Desirably the two slide edges 36 which include an acute angle α relative to each other and the retaining edge 38 of the hole 30 in the retaining member 26 are of such configurations that in the arresting or retaining position, as shown in FIG. 2, both the retaining edge 38 and also the slide edges 36 bear resiliently against the inside contour 44 of the respective peripherally extending groove 24 in the connecting element 18, being the groove which establishes the adjusted set position for the associated head support.

If the retaining member 26 is urged in the direction of the arrow indicated at 45 in FIG. 3, the retaining member 26 is moved into its release position as shown in FIG. 3, while the spring members 40 are at the same time mechanically stressed by being compressed, as can be clearly seen from FIG. 3. In that release position then only the two slide edges 36 bear against the outside contour 32 of the connecting element 18. The retaining edge 38 which interconnects the slide edges 36 is however advantageously spaced from the outside contour 32 of the connecting element 18, in that release position. It will be noted that the retaining edge 38 comprises metal by virtue of being formed by the sheet metal member 28 constituting the retaining member 26, whereas the slide edges 36 are formed by a plastic coating as indicated at 46 on the sheet metal material of the retaining member 26. It will be seen therefore that the retaining edge 38 is spaced from the outside contour 32 of the connecting element 18 while the slide edges 36 bear resiliently thereagainst in the release position of the arresting device, but without metal-to-metal contact between the slide edges 36 and the connecting element 18.

It will be appreciated that the same features of the illustrated structure are identified by the same respective references in each of FIGS. 1, 2 and 3 so that there is no need for all features to be described in full detail with reference to each of those FIGS.

It will be seen that the above-described arresting device according to the invention with its slide edges 36 has the advantage that the pressure in relation to surface area of the retaining member 26 against the outside contour of the connecting element 18 is distributed as between slide edges, instead occuring at a single retaining edge, while in addition the pressure force which actually takes effect on the outside contour of the connecting element 18 perpendicularly thereto is reduced by a factor which corresponds to the sine of half the included angle between the first and second slide edges 36 of the retaining member and is thus very small. Consequently the head support arresting device according to the invention prevents in a simple manner the production of undesirable wear tracks or lines along the outside contour of the connecting element between the recesses 24 therein, in the form of the peripherally extending grooves. On the other hand however the abovedescribed structure according to the invention ensures that the connecting element 18 is very reliably secured in position in the arresting position of the retaining member, with the arresting action being produced in particular by the rectilinearly extending retaining edge 38 comprising metal and in addition by virtue of the two slide edges which include an acute angle relative to each other.

Therefore, as already mentioned above, the arresting or retaining position of the arrangement involves metal-to-metal contact between the retaining edge 38 and the metal surface of the corresponding recess 24 in the connecting element 18. The release position of the assembly involves slidably movable contact of the at least one slide edge 36 of the retaining member 26, said edge comprising the plastic material 46, against the outside contour of the connecting element, thus at least reducing the formation of unattractive wear tracks. That is also avoided in particular by virtue of the fact that in the release position the retaining member 26 is at the same time advantageously spaced from the outside contour of the connecting element 18. Metal-to-metal contact is therefore advantageously eliminated in the release position.

The two slide edges 36 which include an acute angle with each other and the retaining edge are so disposed in the retaining member 26 that in the arresting or retaining position it is in fact only the retaining edge 38 that bears snugly against the inside contour of the connecting element or the corresponding retaining recess 24 therein.

The fact that the slide edges 36 and the retaining edge 38 are of such configurations that in the arresting or retaining position the retaining member 26 also bears resiliently with the slide edges against the inside contour of the respective retaining recess or peripherally extending groove 24 in the connecting element 18 provides for three-sided contact of the retaining member 26 against the inside contour of the respective retaining recess or groove 24 in the corresponding connecting element 18 and thus ensures reliable arresting of the connecting element, thus ensuring that the head support 16 is firmly fixed in relation to the back rest 14 of the corresponding vehicle seat 10.

It will be appreciated that the above-discussed arrangement according to the invention has been set forth solely by way of example and illustration of the principles thereof and that various modifications and alterations may be made therein without thereby departing from the spirit and scope of the invention.

What is claimed is:

1. A head support arresting device co-operable with a connecting element having an outside contour and which connects a height-adjustable head support to a back rest of a vehicle seat, wherein the connecting element includes means for attachment to the back rest and has mutually vertically spaced recesses, the arresting device comprising a housing, a retaining member and means for securing the retaining member for resilient displacement relative to the housing between a retaining position engaging a recess of the connecting element and a release position disengaging the recess, the retaining member having a retaining edge and at least one slide edge, the retaining edge and the slide edge being so provided relative to each other that in the retaining position the retaining edge is engaged into the corresponding recess and in the release position the at least one slide edge bears slidably against the outside contour of the associated connecting element and the retaining edge is spaced from the connecting element;

said retaining edge comprising metal and said at least one slide edge comprises plastic material.

2. A device as set forth in claim 1 wherein the recesses are in the form of peripherally extending grooves in the connecting element.

3. A device as set forth in claim 1 wherein the retaining member has first and second slide edges which include an acute angle with each other and a retaining edge which interconnects the slide edges, and the two slide edges which diverge in a direction away from the retaining edge and the retaining edge are of such a configuration that the retaining edge is spaced from the outside contour of the associated connecting element when the slide edges bear resiliently against the outside contour of the connecting element in the release position of the arresting device and that the retaining edge bears resiliently in the respective recess in the connecting element when the retaining member is in the retaining position.

4. A device as set forth in claim 3 wherein the slide edges and the retaining edge are of such configurations that in the retaining position the retaining member also bears resiliently with the slide edges in the respective recess in the connecting element.

5. A device as set forth in claim 3 wherein the slide edges are disposed symmetrically with respect to a center line oriented perpendicularly to the retaining edge.

6. A device as set forth in claim 1 wherein
the retaining member comprises a sheet metal material and the slide edges are formed by a plastic coating on the sheet metal material of the retaining member.

7. An arrangement for adjustably and arrestably mounting a head support to a vehicle seat back rest, comprising:
an elongate connecting element for supporting a head support, the elongate connecting element having an outside contour and a plurality of recesses which are disposed at mutual spacings in the longitudinal direction of the connecting element; and
an adjusting and arresting device adapted to be mounted to the vehicle seat back rest and co-operable with the connecting element thereby to height-adjustably mount the head support to the vehicle seat back rest, the adjusting and arresting device comprising a housing, a retaining member displaceable in the housing between a retaining position selectively engaging a respective recess of the connecting element and a release position, and spring means urging the retaining member towards the retaining position, the retaining member having a retaining edge and at least one slide edge the retaining edge and the slide edge being so disposed relative to each other that in the retaining position of the device the retaining edge is engaged in said respective recess and in the release position the at least one slide edge bears slidably against the outside contour of said connecting element and the retaining edge is spaced from the connecting element.

8. A head support arresting device co-operable with a connecting element having an outside contour and which connects a height-adjustable head support to a back rest of a vehicle seat, wherein the connecting element includes means for attachment to the back rest and has mutually vertically spaced recesses, the arresting device comprising a housing, a retaining member and means for securing the retaining member for resilient displacement relative to the housing between a retaining position engaging a recess of the connecting element and a release position disengaging the recess, the retaining member having a retaining edge and at least one slide edge, the retaining edge and the slide edge being so provided relative to each other that in the retaining position the retaining edge is engaged into the corresponding recess and in the release position the at least one slide edge bears slidably against the outside contour of the associated connecting element and the retaining edge is spaced from the connecting element;
the retaining member having first and second slide edges which are at an acute angle relative to each other and a retaining edge which is interconnected to the slide edges; and
the two slide edges diverging in a direction away from the retaining edge and the retaining edge are of such a configuration that the retaining edge is spaced from the outside contour of the associated connecting element when the slide edges bear resiliently against the outside contour of the connecting element in the release position of the arresting device and that the retaining edge bears resiliently in the respective recess in the connecting element when the retaining member is in the retaining position.

9. A head support arresting device co-operable with a connecting element having an outside contour and which connects a height-adjustable head support to a back rest of a vehicle seat, wherein the connecting element includes means for attachment to the back rest and has mutually vertically spaced recesses, the arresting device comprising a housing, a retaining member and means for securing the retaining member for resilient displacement relative to the housing between a retaining position engaging a recess of the connecting element and a release position disengaging the recess, the retaining member having a retaining edge and at least one slide edge, the retaining edge and the slide edge being so provided relative to each other that in the retaining position the retaining edge is engaged into the corresponding recess and in the release position the at least one slide edge bears slidably against the outside contour of the associated connecting element and the retaining edge is spaced from the connecting element;
the retaining member comprising a sheet metal material and the slide edges comprise a plastic coating on the sheet metal material of the retaining member.

10. A head support arresting device for a height-adjustable head rest comprising:
a head support;
a housing;
a retainer member movably secured to the housing in an axial direction, the retaining member having a retaining edge and at least one slide edge;
an elongated connecting element connected to the head support and operatively connected to the retainer member, said element having a plurality of axially spaced recesses, the element in a region intermediate the recesses and in the recesses each having a corresponding outer contour surface, said element for connecting the head support to a back rest of a vehicle seat, the connecting element including means for attachment to the back rest;
means for securing the retaining member for resilient displacement relative to the housing between a retaining position engaging a recess of the connecting element and a release position disengaging the recess;
the retaining edge and the at least one slide edge of the retainer member being so arranged relative to each other that in the retaining position the retaining edge is engaged with the corresponding respective recess and in the release position the at least one slide edge bears slidably against the intermediate region outer contour surface of the associated connecting element and the retaining edge is spaced from the connecting element.

11. A device as set forth in claim 10 wherein
the retaining edge comprises metal and the at least one slide edge comprises plastic material.

12. The device of claim 10 wherein the at least one slide edge of the retaining member comprises spaced facing surfaces.

13. The device of claim 12 wherein the spaced surfaces are inclined relative to each other and parallel to the axial direction.

14. The device of claim 13 wherein the spaced surfaces are disposed with the retaining edge therebetween.

15. The device of claim 10 wherein the at least one slide edge of the retainer member comprises material for providing negligible wear on the connecting element during sliding along the connecting element intermediate region outer contour surface and the retainer edge and connecting element are metal.

* * * * *